(12) United States Patent
Valle et al.

(10) Patent No.: US 10,591,007 B2
(45) Date of Patent: Mar. 17, 2020

(54) METHOD FOR MAKING BRAKE DISCS IN FIBER REINFORCED MATERIAL AND BRAKE DISC MADE WITH SUCH METHOD

(71) Applicant: PETROCERAMICS S.p.A., Milan (IT)

(72) Inventors: Massimiliano Valle, Bergamo (IT); Mirco Chiodi, Bergamo (IT); Furio Rozza, Bergamo (IT); Marco Orlandi, Bergamo (IT); Roberto Vavassori, Bergamo (IT)

(73) Assignee: PETROCERAMICS S.p.A., Milan (IT)

( * ) Notice: Subject to any disclaimer, the term of this patent is extended or adjusted under 35 U.S.C. 154(b) by 570 days.

(21) Appl. No.: 14/787,241

(22) PCT Filed: Apr. 26, 2013

(86) PCT No.: PCT/IT2013/000125
§ 371 (c)(1),
(2) Date: Oct. 26, 2015

(87) PCT Pub. No.: WO2014/174540
PCT Pub. Date: Oct. 30, 2014

(65) Prior Publication Data
US 2016/0116010 A1 Apr. 28, 2016

(51) Int. Cl.
*F16D 69/00* (2006.01)
*F16D 65/12* (2006.01)
(Continued)

(52) U.S. Cl.
CPC ............ *F16D 65/126* (2013.01); *B29C 70/32* (2013.01); *B29C 70/545* (2013.01); *B29C 71/02* (2013.01);
(Continued)

(58) Field of Classification Search
None
See application file for complete search history.

(56) References Cited

U.S. PATENT DOCUMENTS 2,175,399 A    10/1939  Judd
2,218,535 A  * 10/1940  Judd ................... F16D 69/022
                                                        138/141

(Continued)

FOREIGN PATENT DOCUMENTS

CN        1114670 A      1/1996
CN        1237950 A     12/1999
(Continued)

OTHER PUBLICATIONS

International Search Report for corresponding International Patent Application No. PCT/IT2013/000125 dated Apr. 16, 2014.

*Primary Examiner* — Jeffry H Aftergut
(74) *Attorney, Agent, or Firm* — Merchant & Gould P.C.

(57) ABSTRACT

A brake disc made of fiber-reinforced material includes a braking band having a predetermined thickness. The method for making the brake discs includes setting up a winding mandrel and forming at least one layer of fibers having a predetermined width. The layer of fibers is impregnated with a binder resin. The impregnated layer is wound about the mandrel, forming a hollow cylindrical body having a predefined outer diameter and an inner diameter substantially equivalent to the mandrel diameter. The layer of fibers is wound about the mandrel in a winding direction substantially parallel to the lengthwise direction of the layer. The cylindrical body is heated to at least partly cross-link the binder resin and obtain a solid semi-finished cylindrical body. The cylindrical body is cut in slices transversely to the cylindrical body axis according to predetermined thicknesses. Each slice is a disc-shaped body defining the disc's braking band.

31 Claims, 6 Drawing Sheets

(51) Int. Cl.
*F16D 69/02* (2006.01)
*B29C 70/32* (2006.01)
*B29C 70/54* (2006.01)
*B29C 71/02* (2006.01)
*F16D 65/02* (2006.01)
*B29K 105/10* (2006.01)
*B29K 105/24* (2006.01)
*B29K 307/04* (2006.01)
*B29L 31/16* (2006.01)

(52) U.S. Cl.
CPC ......... *F16D 65/125* (2013.01); *F16D 65/128* (2013.01); *F16D 69/023* (2013.01); *B29K 2105/106* (2013.01); *B29K 2105/24* (2013.01); *B29K 2307/04* (2013.01); *B29L 2031/16* (2013.01); *F16D 2065/1328* (2013.01); *F16D 2200/006* (2013.01); *F16D 2200/0047* (2013.01); *F16D 2200/0091* (2013.01)

(56) References Cited

U.S. PATENT DOCUMENTS

| | | | | |
|---|---|---|---|---|
| 2,467,999 | A * | 4/1949 | Stephens | B29C 53/566 138/144 |
| 3,356,781 | A * | 12/1967 | Sulewski et al. | B29C 43/027 264/137 |
| 3,743,069 | A * | 7/1973 | Barnett | B29C 70/347 156/173 |
| 3,956,545 | A * | 5/1976 | Afflerbach | F16D 69/026 156/175 |
| 4,244,994 | A * | 1/1981 | Trainor | D04H 3/02 428/37 |
| 2002/0153213 | A1 | 10/2002 | Gruber et al. | |
| 2004/0126535 | A1 * | 7/2004 | Sommer | C04B 35/573 428/66.2 |
| 2012/0279810 | A1 | 11/2012 | Fabris | |

FOREIGN PATENT DOCUMENTS

| | | |
|---|---|---|
| CN | 1251083 A | 4/2000 |
| EP | 1 908 982 A1 | 4/2008 |
| GB | 190738 A * | 12/1922 |

* cited by examiner

METHOD FOR MAKING BRAKE DISCS IN FIBER REINFORCED MATERIAL AND BRAKE DISC MADE WITH SUCH METHOD

This application is a National Stage Application of PCT/IT2013/000125, filed 26 Apr. 2013, and which application is incorporated herein by reference. To the extent appropriate, a claim of priority is made to the above disclosed application.

FIELD OF APPLICATION

The present invention relates to a method for making brake discs of a fibre-reinforced material and a brake disc made by such method.

PRIOR ART

A brake disc of a disc brake system of a vehicle includes an annular structure, or braking band, and a central fastening element, known as bell, through which the disc is fixed to the rotating part of a suspension of a vehicle, such as a hub. The braking band is provided with opposed braking surfaces adapted to cooperate with friction elements (brake pads), housed in at least one caliper body arranged astride of such braking band and integral with a non-rotating component of the suspension of the vehicle. The controlled interaction between the opposite brake pads and the opposed braking surfaces of the braking band by friction determine a braking action which allows the deceleration or stop of the vehicle.

Generally, brake discs are made of metal, particularly gray cast iron or steel. In particular, gray cast iron allows good braking performance to be obtained (especially in terms of containment of wear) at relatively low cost.

Metal brake discs have strong limitations due to weight and are not able to ensure the braking performance required in high range vehicles and racing cars. In these fields, metal discs have long been replaced by discs made of carbon (CC, Carbon-Carbon) or carbon-ceramic material (CCM, Carbo Ceramic Material). In fact, discs made of carbon or in carbon-ceramic combine lightness with mechanical, chemical and dimensional stability, ensuring high braking performance.

Generally both types of materials (carbon and carbon-ceramic) are reinforced with fibres. In fact, the presence of the fibres significantly improves all of the features of the disc, and in particular mechanical strength and heat transmission properties. As regards this, the arrangement of the fibres within the disc plays an essential role.

The fibre reinforced materials have a support matrix which acts as a binder for the fibres. The matrix cooperates with the fibres in the transfer of stresses applied to the material and protects the fibres from possible damage. The matrix is generally produced by subjecting to suitable thermal treatments (in particular heating and pyrolysis or carbonization) organic resins and additives, which vary depending on the type of materials to obtain and/or on the final features of the material itself. Among the most commonly used organic resins we should mention phenolic and epoxy resins.

The fibres may have a random arrangement or be oriented according to one or more preferential directions. There are also materials that contain both fibres randomly arranged and oriented fibres. The fibres may be dispersed in the form of filaments or bundles of filaments in the matrix, as well as be organised in the form of woven or non-woven fabrics. Reinforcing fibres may be of different types. The most used ones are the carbon fibres.

Generally, a method for manufacturing a brake disc either in CC or in CCM provides an initial step of manufacturing a shaped semi-finished product (green body).

The green body may be obtained by moulding a mixture of resins, fibres and additives. The fibres may be arranged inside the mould already mixed with resins and additives, or they may be arranged inside the mould separately from the mixture of resins and additives, so as to suitably orient them.

Alternatively, the green body may be obtained by superimposing layers of fibres in the form of woven or non-woven fabrics, previously impregnated with binder resins (pre-preg) and cut according to the shape of the disc. Alternatively still, the green body may be obtained by winding fibres or bundles of fibres, previously impregnated with binders resins, about a mandrel. Compared to the forming technique by simple moulding, the forming of the green body by winding on mandrel allows the fibres within the brake disc to be more easily and effectively oriented.

In general, it is known to arrange the fibres according to specific orientations in order to impart specific mechanical and/or thermal properties to the green body and to the final disc. For example, a circumferential orientation of the fibres allows the propagation of destructive radial cracks from the centre to the periphery to be opposed, with an increase of the overall mechanical strength.

The forming step of the green body necessarily involves a heat treatment designed to determine a cross-linking, at least partial, of the resin. In fact, the green body must have such mechanical strength features as to make it apt to be manipulated in the later process steps without the risk of fractures or cracks.

The green body thus obtained is then subjected to a thermal firing process at a temperature such as to cause the carbonization or pyrolysis of the resins. By the effect of such firing, the semi-finished product acquires a certain porosity due to the loss of volatile material at the carbonization or pyrolysis temperatures.

If a CC disc is required, the carbonization step is followed by a densification step with carbon, which can be obtained by impregnation with liquid resins or by vapour deposition. Further carbonization and densification steps may follow in a sequence up to the complete filling of the internal porosity.

If a CCM disc is required, the carbonization step is followed by a densification step with silicon infiltration. The molten silicon penetrates in the carbon body so as to react with the carbon in silicon carbide and lead to the formation of a ceramic structure. Antioxidant treatments and mechanical machining and surface finishing steps generally follow.

The disc thus obtained is then completed by associating it to a bell.

The traditional methods described above to make brake discs of fibre reinforced material are operationally complex and expensive. The initial step of making the green body is particularly burdensome. In fact, it is a very delicate process step as it determines the fibre distribution within the disc.

As already mentioned above, the green body must have mechanical strength features such as to make it apt to be manipulated in the later process steps without the risk of fractures or cracks. To prevent the forming of tension within the body, the heat treatment should not be too energetic. Very slow thermal profiles are therefore adopted. This is particularly important in the case of green bodies obtained by winding fibres on mandrel. In fact, the stratified structure of the fibres is more subject to tensions and deformations as compared to a structure with randomly arranged fibres. This results in a lengthening of the process and therefore an increase in costs.

In this perspective, the implementation of CC or CCM brake discs reinforced with fibres provided with ventilation channels accentuates the problems mentioned above. In fact, unless a step for creating the ventilation channels is provided by removal of material (with all the related operating complications), the ventilation channels can only be made by inserting appropriate cores in the green body during the formation, inside the mould or around the mandrel. This greatly complicates the initial forming step of the green body.

Therefore, the need to simplify the production processes, adopting solutions to minimise the process times for making the single brake disc, is very much felt in the production of CC or CCM brake discs reinforced with fibres.

DISCLOSURE OF THE INVENTION

Such need is met by a method for making brake discs of a ribre-reinforced material.

In particular, such need is met by a method for making brake discs of a fibre-reinforced material (each brake disc comprising a braking band having a predetermined thickness s) comprising the following operating steps:

a) arranging a winding mandrel 10 having a predetermined outer diameter D1;

b) forming at least one layer of fibres 20 having a predetermined width W;

c) impregnating the layer of fibres 20 with at least one binder resin;

d) winding the layer of fibres impregnated with resin about mandrel 10 to form a coaxially hollow cylindrical body 30, having a predetermined outer diameter De and an inner diameter Di substantially equivalent to diameter D1 of mandrel 10, the layer of fibres being wound about the mandrel according to at least one winding direction substantially parallel to the direction of length L of layer 20; and e) heating the cylindrical body at temperatures and for a period of time such as to at least partially cross-link the binder resin so as to obtain a semi-finished cylindrical body.

According to a preferred embodiment, the method comprises a step f) of cutting the semi-finished cylindrical body in slices transversely to the longitudinal axis of the cylindrical body itself according to predetermined thicknesses s1, each slice being a disc-shaped body which defines at least the braking band of a brake disc.

Alternatively, the cylindrical body may be sized so as to define itself a single disc-shaped body which defines at least the braking band of a brake disc.

The method may comprise a step g) of post-crosslinking/post-curing thermal treatment.

Such step g) may be carried on the formed semi-finished cylindrical body so as to define itself a single disc-shaped body which defines at least the braking band of a brake disc.

Alternatively, such step g) may be carried out on the semi-finished cylindrical body before the cutting step f) or it may be carried out on at least a part of the slices of the cylindrical body obtained as a result of the cutting step f).

Preferably, the heating step e) of the cylindrical body is carried out at temperatures and for a period of time such as to only partially cross-link the binder resin so as to obtain a semi-finished cylindrical body which is still plastically deformable.

According to a preferred embodiment, the method comprises a step h) of moulding the cylindrical body, in the case where the latter is formed so as to define itself a single disc-shaped body which defines at least the braking band of a brake disc, or the individual slices of the cylindrical body obtained as a result of the cutting step f). Preferably, such moulding step h) is carried out before step g) of post-crosslinking/post-curing thermal treatment and following a step e) of heating/curing in which only a partial cross-linking of the resin has been obtained so that the cylindrical body and/or the slices obtained by cutting are still plastically deformable.

According to a particularly preferred and advantageous embodiment, the moulding step h) is carried out on the cylindrical body (in the case where the latter is formed so as to define itself a single disc-shaped body which defines at least the braking band of a brake disc) or on the individual slices of the cylindrical body by plastically deforming a central portion in the axial direction of the cylindrical body or of the disc-shaped body defined by the single slice to obtain a coaxial cap on the cylindrical body or on the same disk-shaped body, axially projecting from it. Advantageously, such coaxial cap may define the brake disc bell, the undeformed peripheral annular part of the cylindrical body or of the disc-shaped body defining the braking band of the brake disc.

Advantageously, mandrel 10 may have an outer diameter D1 smaller than the inner diameter of the braking band of the brake disc to be obtained, in such a way that the cylindrical body or the disc-shaped body defined by single slice extends radially inwards over the annular portion intended to define the braking band of the brake disc to be obtained.

According to a particularly preferred and advantageous embodiment, the method comprises a step i) of cutting out through openings on the layer of fibres. Such cutting out step i) is carried out before the step d) of winding the layer about the mandrel.

Preferably, such through openings are obtained on the layer of fibres 20 according to a distribution in rows. Each row of openings extends in the direction of the width of the layer. The openings of a row are aligned with the openings of the other rows in the direction of the length of the layer of fibres.

Advantageously, the interdistance between the rows of openings is regulated as a function of the radial position that the single row must take in the cylindrical body relative to the other rows, so that during the winding step d) the openings radially overlap so as to form radial cavities. By adjusting these parameters, three-dimensional structures may be created as desired. Each radial cavity may extend from the outer surface of the final cylindrical body to a predetermined radial depth. Such radial cavities may define ventilation channels obtained in the thickness of the braking band of the brake disc to be obtained.

Preferably, the size and shape of the openings of the individual rows are adjusted as a function of the radial position that the single row must take in the cylindrical body relative to the other rows, so as to adjust the inner section of each radial cavity according to the radial dimension.

During the winding step d), a pressure may be applied to the layer of fibres being wound to make the portion of the layer of fibres being wound adhere to the cylindrical body being formed.

The pressure may be applied to the layer of fibres through the tensioning of the layer itself and/or by pressing rollers arranged in the vicinity of the mandrel.

Preferably, in the case where the binder resins that impregnate the layer of fibres are epoxy, the pressure is in the range between 1 and 10 bar.

Preferably, in the case where the binder resins that impregnate the layer of fibres are phenolic, the pressure is in the range between 1 and 5 bar.

Preferably, the heating of the cylindrical body being formed is carried out so as to obtain the smallest possible thermal gradient inside the cylindrical body being formed, within the body itself, preferably zero.

Advantageously, the heating of the cylindrical body being formed may be also carried out in a differentiated manner as a function of the cylinder area being formed. As will be explained hereinafter, the composition and the inner structure of the cylinder may radially vary in order to impart different properties to different areas of the cylinder. For example, it is possible to differentiate the composition and structure between the braking surface and the bell coupling area. The differential heating as a function of the cylinder area being formed may therefore be used to adapt to production needs related to differences in the fibre composition.

According to a particular embodiment of the method, step e) of heating the cylindrical body is all or at least partly carried out during the step d) of winding the layer of fibres about the mandrel.

Advantageously, the heating of the cylindrical body being formed may be at least partly obtained through heating means arranged outside the cylindrical body being formed.

Preferably, the heating of the cylindrical body being formed is at least partly obtained also by means of heating means arranged in the winding mandrel, in combination with the above outer heating means.

The combination of outer and inner heating allows a better control of the thermal gradient inside the cylindrical body being formed. In particular, it may be aimed to obtain the smallest possible thermal gradient inside the cylindrical body.

More generally, it is preferable to heat the cylindrical body being formed as homogeneously as possible in all its thickness. In particular, it is to be prevented that some sectors of the cylinder are subjected to more intense heat treatments than other sectors, with the risk that internal stresses are generated during the forming of the body itself such as to damage or crack the body itself. For this purpose, during the heating step it is possible to monitor the thermal gradient pattern, for example by detecting over time, by means of suitable sensors, the temperatures on the inner and outer surface of the body being formed itself.

Preferably, in the case where the binder resins are epoxy, during the heating step e) of the cylindrical body, the temperature of the cylindrical body being formed is kept in the range between 120° C. and 250° C. If a complete cross-linking is desired, the temperature must be higher than 200° C. If a complete cross-linking is not desired, the temperature may be below 200° C.

Preferably, in the case where the binder resins are phenolic, during the heating step e) of the cylindrical body, the temperature of the cylindrical body being formed is kept in the range between 100° C. and 230° C. If a complete cross-linking is desired, the temperature must be higher than 180° C. If a complete cross-linking is not desired, the temperature may be below 180° C.

Advantageously, the method may comprise a step l) of pre-heating the layer of fibres. Such pre-heating step l) is carried out before step b) of impregnation with resins and thus before step d) of winding about the mandrel. Preferably, in such pre-heating step l), the fibres are heated to temperatures below the cross-linking point of the resin with which the layer of fibre will then be impregnated.

Advantageously, the method may comprise a step m) of pre-heating the resin which must be applied to the layer of fibres in the impregnation step b), and thus prior to step d) of winding about the mandrel. In such pre-heating step m), the resin is heated to temperatures below the cross-linking point in order to reduce its viscosity and increase its homogeneity.

Preferably, the method comprises at least a step n) of consolidation of the layer of fibres carried out after the impregnation step b). Such consolidation step n) is carried out by applying a pressure to the layer of fibres already impregnated in order to make the resin penetrate in the layer of fibres itself. Preferably, such consolidation step n) is carried out through one or more pairs of opposing pressing rollers.

Advantageously, the method comprises at least one step o) of heating the layer of fibres impregnated with resins. Such step o) is carried out between the impregnation step b) and the winding step d). In such heating step o), the layer of impregnated fibres is progressively heated up to temperatures close to, but lower than, resin cross-linking temperatures, or to resin cross-linking temperatures.

Advantageously, in the impregnation step c), the binder resin may be applied to the layer of fibres by deposition or dipping.

Preferably, said at least one layer of fibres 20 consists of carbon fibres. However, also other fibres made of other materials suitable for the purpose may be contemplated.

The layer of fibres may consist of continuous fibres, chopped fibres or a mixture of chopped and continuous fibres.

In particular, the layer of fibres comprises continuous fibres arranged according to one or more predefined directions, which in particular may be intersecting with one another.

In particular, the layer of fibres may consist of a fabric of continuous fibres.

In particular, the layer of fibres may consist of a non-woven fabric of fibres, cut and/or continuous.

Advantageously, said at least one layer of fibres 20 has a multilayer structure. Preferably the layers of such multilayer structure have fibre orientations and/or composition different from each other.

According to a particular embodiment of the method, said at least one layer of fibres 20 has a fibre orientation and/or composition variable along its own length and/or width development.

During the winding step d), more than one layer of fibres 20 may be wound about the mandrel, having different fibre orientations and/or composition.

Advantageously, during the winding step d), the winding direction of the layer of fibres about the mandrel may be varied to vary the fibre orientation inside the cylindrical body being formed.

Preferably, the operating steps of the method are carried out continuously on the layer of fibres which is progressively formed and continuously wound about the winding mandrel.

The semi-finished cylindrical body or the disc-shaped bodies obtained by cutting the cylindrical body may be subjected to at least a pyrolysis step and a subsequent densification step to obtain CC bodies.

The semi-finished cylindrical body or the disc-shaped bodies obtained by cutting the cylindrical body may be subjected to at least a pyrolysis step and a subsequent silicon infiltration step to obtain CCM bodies.

DESCRIPTION OF THE DRAWINGS

Further features and advantages of the present invention will appear more clearly from the following description of preferred and non-limiting embodiment examples thereof, in which.

DETAILED DESCRIPTION

Figure 1:
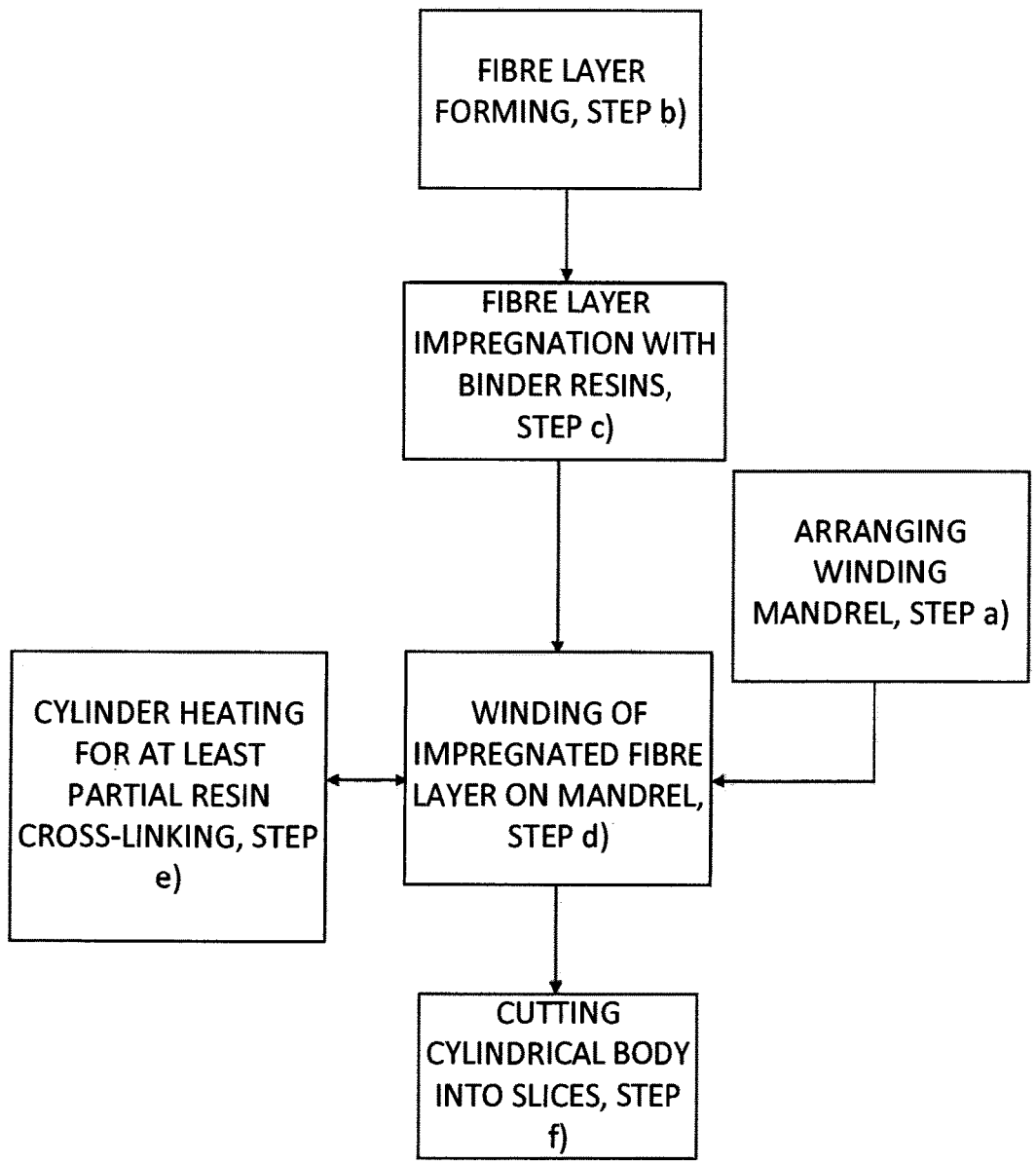
FIG. 1 shows a block diagram of a preferred embodiment of the method according to the present invention.

With reference to the above figures, reference numeral 1 globally indicates a brake disc made of fibre-reinforced material obtained with the method according to the present invention.

Brake disc 1 comprises an annular structure 2, or braking band, and a central fastening element 3, known as bell, through which the disc is fixed to the rotating part of a suspension of a vehicle, such as a hub. The braking band 2 has a predetermined thickness s (dimension defined in the axial direction) and is provided with opposed braking surfaces adapted to cooperate with friction elements (brake pads), accommodated in a caliper body arranged astride of such braking band and integral with a non-rotating component of the vehicle suspension. The controlled interaction between the opposing brake pads and the opposed braking surfaces of the braking band determine a braking action by friction which allows the deceleration or stopping of the vehicle.

A brake disc 1 obtainable by the method according to the present invention has at least the braking band 2 made of a material reinforced by fibres, which may be of the CC or CCM families. Such material has a support matrix which acts as a binder for the fibres. The matrix cooperates with the fibres in the transfer of stresses applied to the material and protects the fibres from possible damages. The matrix is generally produced by subjecting organic resins to suitable heat treatments (e.g. heating and pyrolysis or carbonization). Preferably, additives are present in the matrix, which, as the binder resins used, vary depending on the type of material to be obtained and/or on the final features of the material itself. The above heat treatments alter the resins and additives.

As will be explained in the following description, the method according to the present invention in particular allows the orientation of the fibres within the matrix to be adjusted. For example, the method according to the invention allows the fibres to be arranged circumferentially in the braking band. However, more complex fibre orientations may also be obtained. The method also allows a random arrangement of the fibres within the matrix.

As will be explained in the following description, the method according to the present invention in particular allows the composition of the material forming the disc (both in terms of fibres and of matrix) to be adjusted.

As will be explained hereinafter in the description, the method according to the present invention may provide for the braking band 2 to be made separately from bell 3 and for the two components to be combined in a final assembly step of the brake disc. In particular, the two components—band and bell—may be made of different materials: the band of a fibre-reinforced material, CC or CCM, and the bell, for example, of a metal material. Advantageously, the method according to the present invention may alternatively provide for the bell to be made in one piece with the braking band, and thus to be also made of the same fibre-reinforced material, CC or CCM, of which the braking band is made.

The method according to the invention will be described referring to elements/devices that will then be described hereafter in the description of some exemplary plants for carrying out the method, illustrated in FIGS. 3 to 7. For simplicity of description, therefore, the same reference numerals will be used.

According to a general embodiment of the present invention, the method for making brake discs of a fibre-reinforced material comprises the following operating steps:

a) arranging a winding mandrel 10 having a predetermined outer diameter D1;

b) forming at least one layer of fibres 20 having a predetermined width W;

c) impregnating such layer of fibres 20 with at least one binder resin;

d) winding the layer of fibres impregnated with resin about mandrel 10 to form a coaxially hollow cylindrical body 30, having a predetermined outer diameter De and an inner diameter Di substantially equivalent to diameter D1 of mandrel 10; the layer of fibres is wound about the mandrel according to at least one winding direction substantially parallel to the direction of length L of layer 20;

e) heating the cylindrical body to temperatures and for a period of time such as to at least partially cross-link the binder resin so as to obtain a solid semi-finished cylindrical body.

According to a particular embodiment of the present invention, the cylindrical body is sized so as to define itself a single disc-shaped body which defines at least the braking band of a brake disc.

According to a preferred embodiment of the present invention, shown in particular in the block diagram of FIG. 1, the method comprises a step f) of cutting the semi-finished cylindrical body in slices transversely to the longitudinal axis of the cylindrical body itself according to predetermined thicknesses s1. Each slice is an axially hollow disc-shaped body which defines at least the braking band 2 of a brake disc 1. Thanks to this preferred embodiment, it is possible to obtain a plurality of disc-shaped bodies 31 from a single semi-finished body (green body), each of which is then processed to obtain at least the braking band 2 of a brake disc 1. The number of disc-shaped bodies obtainable from a single cylindrical body 30 depends on the length of the cylindrical body and on thickness s1 of the disc-shaped bodies to be obtained.

The method according to the invention allows the production process of brake discs made of a fibre-reinforced material to be greatly simplified.

The advantages in terms of operational simplification are manifold. It is no longer necessary to control n distinct processes for making the green body, but only one. In fact, the semi-finished disc-shaped bodies (green bodies) that form the basis for making the brake discs need not be made one by one for each single disc, with n moulding and resin cross-linking steps.

The advantage is not only in terms of reduction of the operating steps, but also in terms of simplification of the quality control of the resulting products. In fact, the production of the disc-shaped bodies in batches, rather than in individual pieces, leads to a reduction of the operations related to quality control. Moreover, the production has more homogeneous features, both in terms of fibre distribution within the matrix and in terms of cross-linking level of the binder resin. Also clear are the advantages in terms of reproducibility of the results.

Preferably, mandrel 10 has a predetermined length L1, not less than width W of the layer of fibres. This is useful to prevent the risk that at one or both ends, the cylindrical body being formed is not supported by the mandrel and may collapse or deform, with waste of material and increase in costs.

Preferably, the method comprises a step g) of post-crosslinking (post-curing) thermal treatment, aimed to complete or consolidate the cross-linking of the resin started in the heating step e). Such step g) is therefore carried out after the heating step e) of the cylindrical body.

According to particular embodiments, after the heating step e) of the cylindrical body, the post-crosslinking step g) may be not provided, if the resulting solid semi-finished cylindrical body already has such mechanical strength and rigidity to be manipulated without being subject to deformation.

Preferably, the post-curing step g) is carried out in a furnace, with temperatures which reach 150-250° C. and residence times ranging from 2 to 6 hours and in any case for about 150 s for each centimeter of thickness of the article to be treated.

Figure 2:
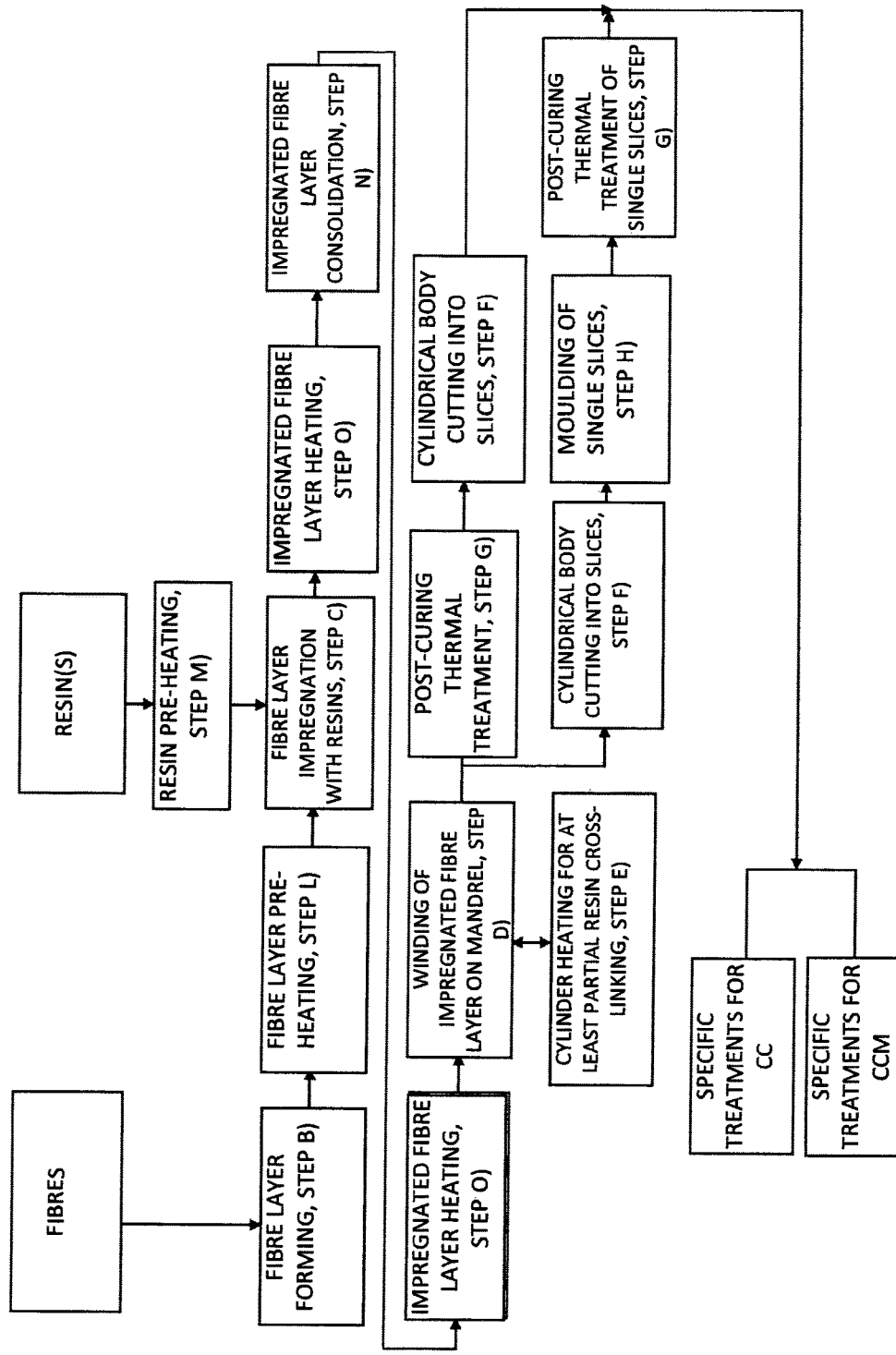
FIG. 2 shows a block diagram of a preferred embodiment of the method according to the present invention.

As shown in the block diagram of FIG. 2, the post-crosslinking (post-curing) thermal treatment step g) may be carried out directly on the semi-finished cylinder body 30 before the cutting step f) or it may be carried out on at least a part of the slices obtained by cutting the semi-finished cylindrical body 30, i.e. after the cutting step f).

Alternatively, the post-crosslinking (post-curing) thermal treatment step g) may be carried out directly on the semi-finished cylinder body 30 if the cylindrical body is sized so as to define itself a single disc-shaped body which defines at least the braking band of a brake disc.

As shown in the block diagram of FIG. 2, the disc-shaped bodies obtained by cutting the cylindrical body into slices—before or after the post-crosslinking (post-curing) thermal treatment step g)—are subjected to specific treatments, depending on whether the braking band 2 of the brake disc 1 to be obtained should be made of fibre-reinforced CC or CCM. In particular, if the braking band 2 should be made of CC, the individual disc-shaped bodies will be subjected to at least a pyrolysis/carbonisation step and at least one subsequent densification step. If the braking band 2 should be made of CCM, the individual disc-shaped bodies will be subjected to at least a pyrolysis/carbonisation step and at least one subsequent silicon infiltration step. No more detailed description of these specific steps is provided since they are achievable with techniques and devices known to one skilled in the art.

The above specific thermal treatments, which vary depending on whether the braking band 2 should be made of fibre-reinforced CC or CCM, may also be carried out directly on the cylindrical body, if the latter is sized so as to define itself a single disc-shaped body which defines at least the braking band of a brake disc.

What follows in the present description may be applied both if the discs are obtained by cutting the cylindrical body, and if the cylindrical body defines itself a single disc and no cutting step is provided.

According to a particular embodiment of this method, the post-crosslinking step g) may conveniently be absorbed in the pyrolysis/carbonisation step (carried out, for example, in a continuous furnace) provided both in the case of CC discs and in the case of CCM discs.

Advantageously, in addition to binder resins, additives may be applied to the layer of fibres 20. Such additives may be applied to the layer of fibres separately from the resins, for example in the form of separate deposition layers, or they may be applied to the layer of fibres mixed with the resins themselves. As already mentioned above, the binder resins and any additives are selected according to the type of material (CC or CCM) to be obtained.

Advantageously, during the winding step d), a single layer of fibres 20 may be wound about the mandrel or more than one layer of fibres 20, which preferably but not necessarily differ from one other in terms of fibre orientation and/or composition of the resins and/or of the fibres.

The winding of more than one layer about the mandrel may be made:
  simultaneously on different longitudinal positions of the mandrel, obtaining in this case a differentiation of the cylinder features along the mandrel axis, and thus in the disc thickness; or
  sequentially, with the layers wound one after another about the mandrel, obtaining in this case a differentiation of the cylinder features, and thus of the discs, in radial direction.

A combination of the above two modes of winding a plurality of distinct layers may be contemplated.

The single layer of fibres 20 (both in the case of winding a single layer or more than one layer distinct layers) comprises reinforcement fibres, of any composition suitable for the purpose. Mixtures of different fibres may be contemplated. Preferably, the fibres used are carbon.

Also the size of the fibres—in terms of diameter and cutting—are selected according to the features to impart to the brake disc 1.

The single layer of fibres may consist of continuous fibres, chopped fibres or a mixture of chopped and continuous fibres.

In particular, the layer of fibres comprises continuous fibres arranged according to one or more predefined directions, which in particular may be intersecting with one another.

The fibres may be arranged in layer 20 either unidirectionally or according to multiple directions. A multi-directional arrangement of the fibres may be obtained by weaving the fibres (e.g. structure with warp and weft) or by overlapping several layers having different fibre orientations (as will be described hereinafter).

In particular, the layer of fibres may consist of a fabric of continuous fibres.

Alternatively, the layer of fibres may consist of a non-woven fabric of fibres, either chopped and/or continuous.

The layer of fibres may also have a completely random fibre distribution.

As will be described hereinafter, the single layer may have the fibres arranged in an orderly manner in some portions and the fibres randomly arranged in other portions.

As will be described hereinafter, the layer of fibres 20 may be formed in different ways, depending also on the features of the fibres used.

Figure 3:
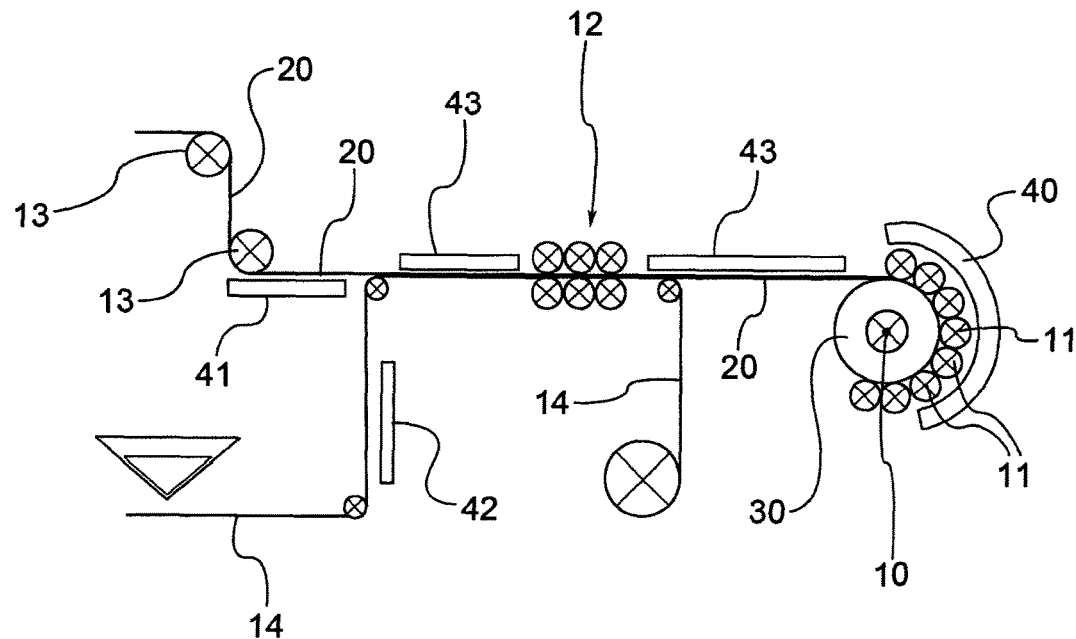
FIG. 3 shows a simplified diagram of a plant for implementing a particular embodiment of the method according to the present invention in the case of treatment of continuous fibres and of application of semi-fluid resins.
Figure 5:
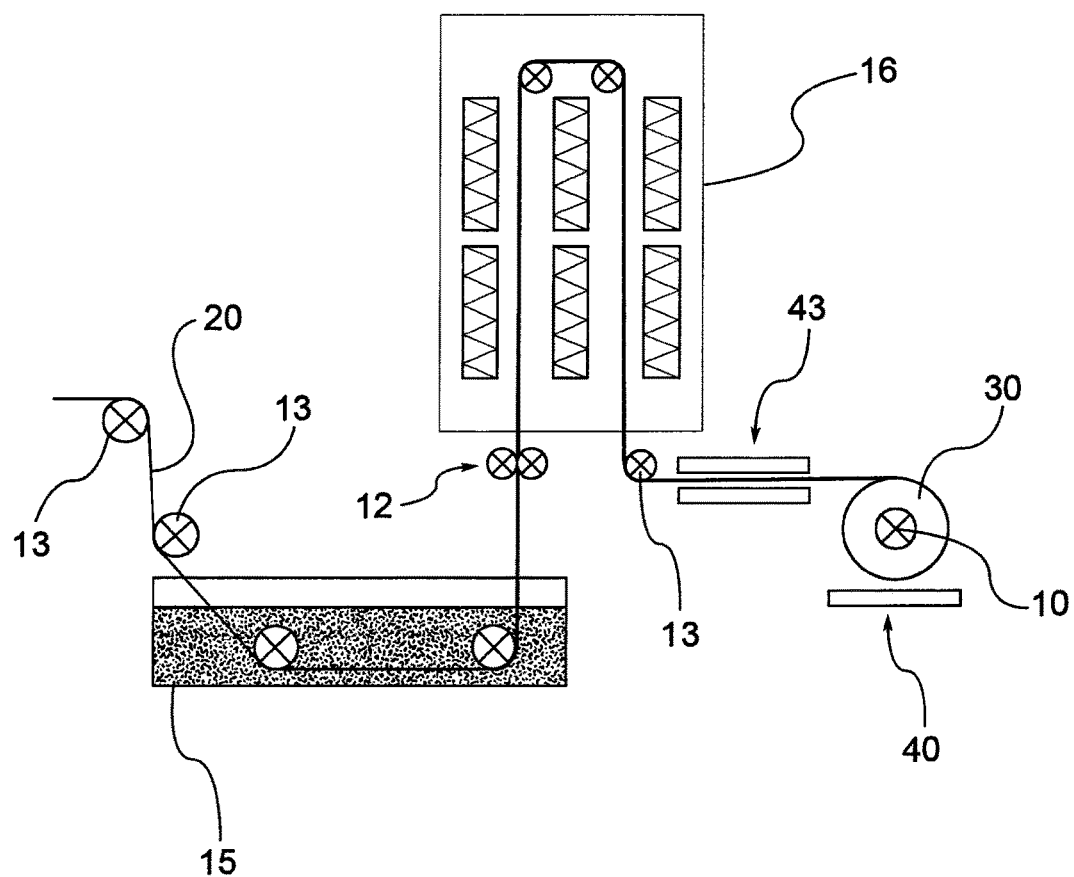
FIG. 5 shows a simplified diagram of a plant for implementing a particular embodiment of the method according to the present invention in the case of application of liquid resin to the fibres.

As shown for example in the diagrams of FIGS. 3 and 5, the layer of fibres 20 may be formed starting from continuous fibre coils.

Figure 4:
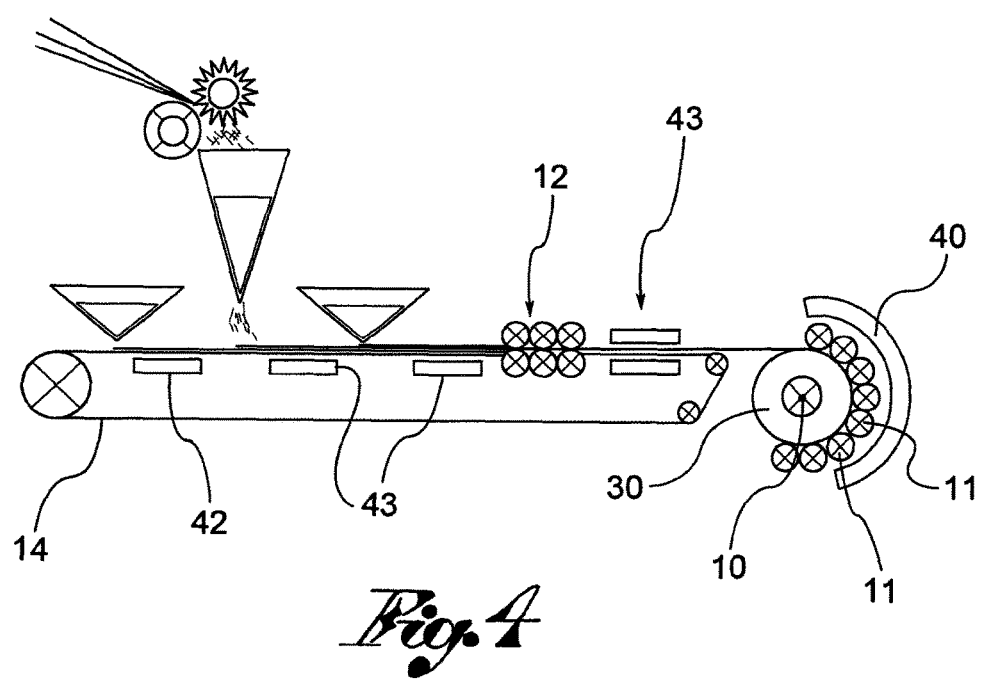
FIG. 4 shows a simplified diagram of a plant for implementing a particular embodiment of the method according to the present invention in the case of treatment of chopped fibres and of application of semi-fluid resins.

As shown for example in the diagram of FIG. 4, the layer of fibres 20 may be made starting from chopped fibres. In this case, the chopped fibres are deposited on a transport film, forming a mat of randomly arranged fibres.

Advantageously, the chopped fibres deposited on the transport film may be oriented by means of suitable orientation devices which may obtained on the same transport film (e.g. via ribs) or which may be external to the film, such as combs.

According to embodiments of the method not shown in the attached figures, if the layer has portions with fibres orderly arranged and portions with fibres randomly arranged, the two embodiment modes (with continuous fibres and with chopped fibres) may be combined together.

Preferably, as will be described hereinafter, the step b) of forming the layer of fibres 20 is continuous. The formed layer is thus progressively continuously wound on the mandrel. The layer forming step may then be carried out in line with the other steps of the method. This imparts greater operating flexibility to the method according to the invention.

Alternatively, the layer of fibres may be made separately from the other steps of the method. The layer of fibres may be stored, for example, in the form of coils and be then fed to the production process for winding about the mandrel.

Advantageously, the properties of the layer are selected according to the desired features to impart to the cylindrical body and thus to the disc-shaped bodies that can be made therefrom.

The layer of fibres may have a fibre orientation differentiated along its development, in particular along the longitudinal development direction. In this way, by appropriately selecting the features of the layer in terms of fibre orientation, it is possible to differentiate the features of the cylindrical body, in particular in radial direction.

For example, it is possible to form the layer of fibres 20 in such a way that the portions of the layer which will form the areas of the single disc (defined by the cylindrical body taken in its entirety) or of the discs (obtained from the cylinder by cutting) subject to greater load and physical stress have fibres arranged according to one or more predetermined orientations, while the other portions of the layer which will form areas less subject to load and physical stress have randomly arranged fibres.

Advantageously, in combination with or alternatively to a differentiation in the fibre orientation, the layer of fibres may have a different composition in terms of fibres and/or resin binders and/or additives, along its development, in particular along the longitudinal development direction and/or along the width development direction. In this way, by appropriately selecting the features of the layer in terms of composition, it is possible to differentiate the features of the cylindrical body, in particular in radial direction and in the winding axis direction (i.e. in particular in the thickness of the single disc or of the final discs).

In particular, if the layer of fibres 20 has a differentiated composition along the longitudinal development direction, a single disc-shaped body or multiple disc-shaped bodies are obtained with a composition differentiated in the radial direction. For example, it is possible to obtain discs in which the innermost sectors of the cylindrical body (and therefore of the disc-shaped bodies) are made with fibres of a first material, while the outermost sectors (e.g. those that form the braking band of the disc) are made with fibres of a second material.

In particular, if the layer of fibres 20 has a differentiated composition along the width development direction, a single disc-shaped or multiple disc-shaped bodies are obtained with a composition differentiated in the thickness direction (which coincides with the winding axis). For example, it is possible to obtain discs formed from layers having a different composition. In this way it is for example possible to make—in the single disc-shaped body (defined by the cylindrical body in its entirety) or in the disc-shaped bodies obtained by cutting the cylinder—superficial layers of different composition compared to more internal layers. This is particularly useful in particular in the braking bands where specific surface friction layers may be envisioned.

Advantageously, the layer of fibres 20 may be single layer or multilayer, so as to form sandwich structures.

Preferably the layers of the multilayer structure have fibre orientations and/or composition different from each other.

Advantageously, if the layer of fibres has a multilayer structure, for each individual layer it is possible to envision a specific forming line. The different forming lines, operating in parallel, will convey their products on a single assembly line of the multilayer. The multilayer thus produced will then be sent to the rolling step.

Advantageously, the differentiation of the features of fibre orientation and/or of composition of the material (fibres, resins and/or additives) may be obtained either by winding a single continuous layer of fibres about the mandrel with features which differ along its development (for example in length and/or width) or (as already mentioned) by sequentially winding distinct layers of fibres that differ from one another in their fibre orientation and/or composition. In the latter case, the winding order of the different layers of fibres depends on the features to be imparted to the single disc (defined by the cylindrical body in its entirety) or to the final discs (obtained by cutting the cylindrical body).

The features of the layer of fibres 20 may be varied depending on the forming step of the cylindrical body in the process of winding about the mandrel. For example, the features of the layer of fibres 20 may be varied—in terms of fibre orientation and/or composition—in such a way that the cylindrical body has different features, for example, in radial direction.

Advantageously, changes in the fibre orientation inside the cylindrical body being formed may be obtained during the winding step d) by varying the winding direction of the layer of fibres about the mandrel. The change in the winding direction may be made both while maintaining constant the features of the layer of fibres constant and simultaneously varying the features of the layer itself.

Operationally, the winding direction of the layer of fibres may be varied by changing the relative position between the mandrel and the layer of fibres.

The method according to the present invention therefore provides a high flexibility in terms of ability to control and adjust the fibre orientation and/or composition inside the cylindrical body and thus inside the single disc-shaped body (defined by the cylindrical body in the its entirety) or disc-shaped bodies (obtained by cutting the cylindrical body) that form at least the braking bands of the brake discs.

Advantageously, the step c) of impregnation of the layer of fibres 20 with resin may be performed using any technique suitable for the purpose. In particular, the binder resin may be applied to the layer of fibres by direct deposition on the layer or by dipping the layer of fibres inside a resin tank. As shown in the diagram of FIG. 4, the association between layer of fibres and resin may be obtained by depositing the fibres on a resin layer made, for example, on a transport film. This technique is preferably adopted if the layer of fibres is made continuously from chopped fibres. However, it may also be adopted in the case in which the layer is made from continuous fibres.

Any resin suitable for the purpose may be used as binder resin. One type only of resin may be used, or also mixtures of different resins.

In general, any organic resin having a high yield of carbon may be used. Preferably, phenolic or epoxy resins are used. In the case of CCM, pre-ceramic resins such as siloxanes or silanes may also be used.

As already mentioned above, the binder resin may be added in a mixture of additives of various nature, such as coke, graphite, carbon fibres.

As already mentioned above, the impregnation of the single layer of fibres may be carried out in a differentiated manner so as to vary the composition of the resins and/or additives applied from portion to portion of the same layer.

Preferably, during the winding step d), a predetermined pressure is applied to the layer of fibres being wound to make the portion of the layer of fibres being wound adhere to the cylindrical body being formed. The value of the applied pressure varies according to the features to be imparted to the brake disc 1. In particular, depending on whether the coils of the layer being wound should adhere more or less to one another, the value of the applied pressure will be increased or decreased.

The pressure may be applied to the layer of fibres by tensioning the same layer of fibres and/or by pressing rollers 11 arranged in the vicinity of mandrel 10 (as shown in FIGS. 3 and 4).

Preferably, the value of the applied pressure is selected depending on the type of resin used and on the process temperature. If the binder resins are epoxy, the pressure is preferably between 1 and 10 bar. If the binder resins are phenolic, the pressure is preferably between 1 and 5 bar. Such values are chosen to achieve a good penetration of the resin inside the layer of fibres and a good adhesion between the various wound layers, so as to obtain a body of solid material, compact and well formed.

As already said, the heating step e) of the cylindrical body is carried out at temperatures and for a period of time such as to at least partially cross-link the binder resin so as to obtain a semi-finished cylindrical body. The at least partial cross-linking of the resin must be such as to impart such mechanical strength features to the cylindrical body as to make it easy to manipulate and processed. In particular, the cylindrical body should be compact, in order to prevent it from flaking if handled or if subject to subsequent processing. For example, the body must be able to be cut into slices without losing its shape.

Preferably, said step e) of heating the cylindrical body is all or at least partially carried out during the step d) of winding of the layer of fibres about the mandrel. On the one hand, this allows the timing of the heat treatment to be optimized, which may already be started during the step of formation of the cylindrical body, and on the other hand it also allows the forming process of the cylindrical body to be improved. In fact, the resin cross-linking (even if partial) is induced immediately as the cylindrical body is formed, operating coil on coil and not on the final cylindrical body already formed. The body that is gradually forming is thus consolidated at the same time. This leads to substantial benefits in terms of improved mechanical strength properties and homogeneity of the body obtained.

The cross-linking heat treatment may also be carried out almost independently of the size of the cylindrical body, since it is performed on the surface coil of the body being formed and not on the final body. This thus reduces the delays associated with temperature gradients between the outside and inside of the body.

Preferably, the heating of the cylindrical body being formed is carried out so as to obtain the smallest possible thermal gradient inside the cylindrical body being formed, within the body itself, preferably zero. In other words, it is done so as to obtain a homogeneous heating of the cylindrical body as much as possible.

Advantageously, the heating of the cylindrical body may be at least partly obtained through heating means 40 arranged outside the cylindrical body being formed. Such heating means may be of any type suitable for the purpose, such as resistive, by IR and/or UV lamps, ion bombing, etc.

Preferably, the heating of the cylindrical body being formed may be at least partly obtained also by heating means arranged in the winding mandrel 10, in order to heat the cylindrical body being formed also from the inside, in combination with the aforesaid outer heating means. The combination of internal and external heating is aimed to obtain the smallest possible thermal gradient inside the cylindrical body being formed.

The heating from the inside—which is preferably carried out in association with heating from the outside—in particular allows the inner layers of the cylinder (i.e. those closest to the mandrel) to be kept warm, facilitating the consolidation of the body.

More generally, it is preferable to heat the cylindrical body being formed in all its radial thickness. In particular, it is to be prevented that some sectors of the cylinder are subjected to more intense heat treatments than other sectors, with the risk that internal stresses are generated during the forming of the body itself such as to damage or crack the body itself. For this purpose, during the heating step it is possible to monitor the thermal gradient pattern, for example by detecting over time, by means of suitable sensors, the temperatures on the inner and outer surface of the body being formed itself.

Preferably, if the binder resins impregnating the layer of fibres are epoxy, during the heating step e) of the cylindrical body, the temperature of the cylindrical body being formed is kept in the range between 120° C. and 250° C. If a complete cross-linking is desired, the temperature must be higher than 200° C. If a complete cross-linking is not desired, the temperature may be below 200° C.

If the binder resins that impregnate the fibre layer are phenolic, the temperature of the cylindrical body being formed is kept between 100° C. and 230° C. The degree of cross-linking is adjusted according to the duration of the heat treatment. If a complete cross-linking is desired, the temperature must be higher than 180° C. If a complete cross-linking is not desired, the temperature may be below 180° C.

Advantageously, the heating of the cylindrical body being formed may be also carried out in a differentiated manner as a function of the cylinder area being formed. As will be explained hereinafter, the composition and the inner structure of the cylinder may radially vary in order to impart different properties to different areas of the cylinder. For example, it is possible to differentiate the composition and structure between the braking surface and the bell coupling area. The differential heating as a function of the cylinder area being formed may therefore be used to adapt to production needs related to differences in the fibre composition.

According to a particularly preferred embodiment of the invention, the method comprises a step i) of cutting out through openings 50 on the layer of fibres 20. Such cutting out step i) is carried out before the step d) of winding the layer about the mandrel.

Figure 6:
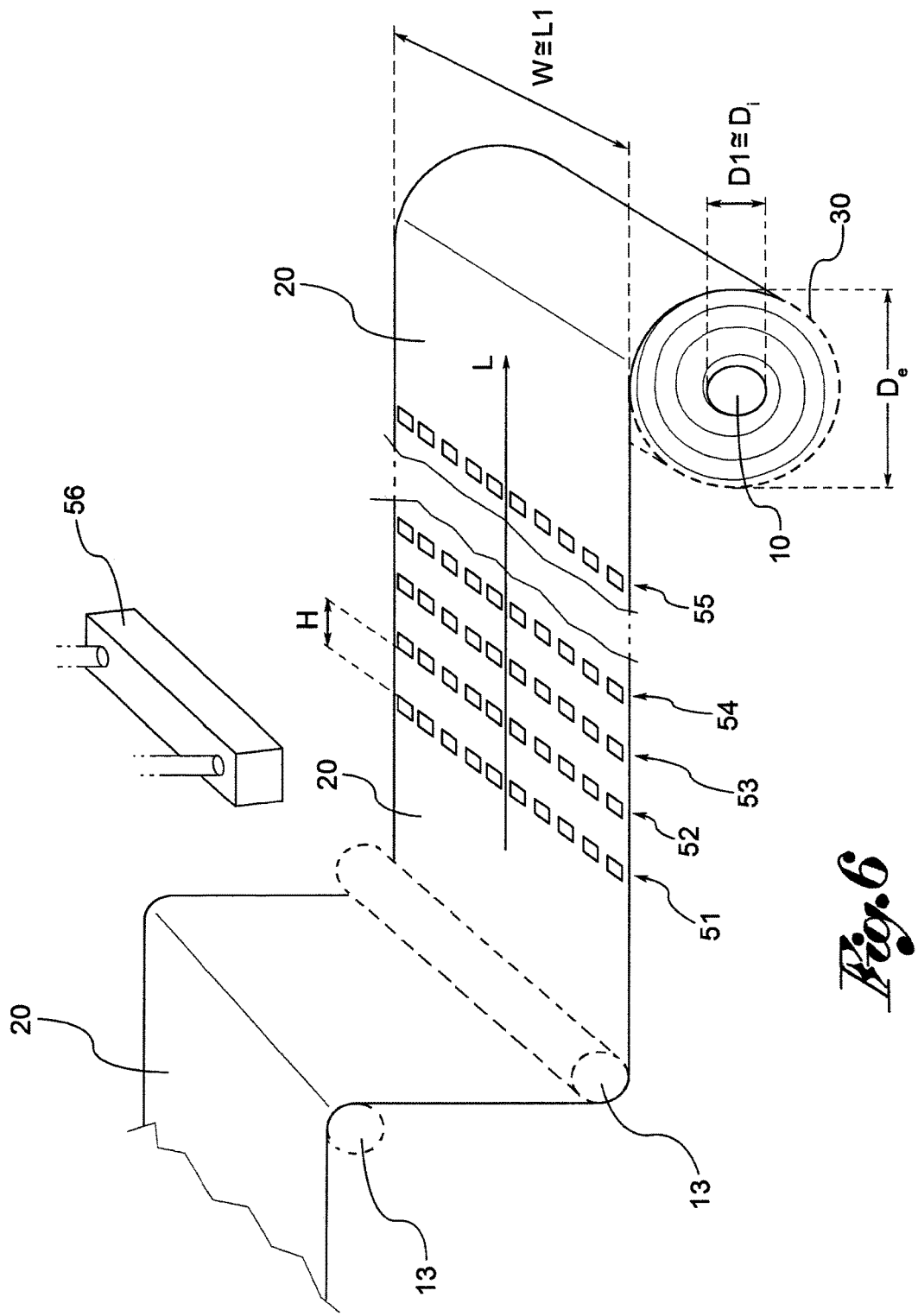
FIG. 6 shows a simplified diagram of a portion of a plant for implementing a particular embodiment of the method according to the present invention for making radial ventilation channels in brake discs.

Preferably, as shown in FIG. 6, the above through openings 50 are formed on the layer of fibres 20 according to a row distribution. Each row 51-55 of openings extends in the direction of width W of layer 20. Openings 50 of a row are made so that they are aligned with the openings of the other rows in the direction of length L of the layer of fibres 20.

Advantageously, from an operating point of view, inter-distance H between the rows of openings 51-55 is regulated as a function of the radial position that the single row must take in the cylindrical body relative to the other rows, so that during the winding step d), openings 50 of different rows overlap radially so as to form radial cavities. Each of these cavities may be made to extend from the outer surface of the final cylindrical body up to a predetermined radial depth. Such radial cavities may therefore define ventilation channels obtained in the thickness of the braking band of the brake disc to be obtained.

Preferably, the size and shape of the openings of the individual rows may be adjusted as a function of the radial position that the single row must take in the cylindrical body relative to the other rows, so as to adjust the inner section of each radial cavity according to the radial dimension. It is therefore possible to obtain radial cavities with variable inner section along the radial direction.

This operating solution is extremely flexible and more efficient than the solution which provides for the use of internal cores. In the first place, it does not provide for the arrangement, positioning and extraction of cores. In the second place, it is not limited by the need of ensuring the removability of the cores from the cylindrical body, which requirement greatly limits the shapes adoptable for the internal cores. This system is an alternative to a system that uses disposable cores that pose operating complications related to the extraction of the cores.

Operationally, openings 50 on the layer of fibres 20 may be made by suitable cutting devices (only schematically shown in FIG. 6 and indicated with reference numeral 56), managed by an electronic control unit suitably programmed for the purpose.

According to a preferred embodiment of the method of the invention, step e) of heating the cylindrical body is carried out at temperatures and for a period of time such as to only partially cross-link the binder resin so as to obtain a semi-finished cylindrical body which is still plastically deformable.

Advantageously, as already mentioned above, the semi-finished cylindrical body 30 thus obtained—still plastically deformable—may be subjected to step f) of cutting into slices to obtain a plurality of disc-shaped bodies 31 that can be subjected to moulding. The method according to the invention may therefore comprise a step h) of moulding the individual slices of the cylindrical body obtained as a result of the cutting step f).

Such moulding step may also be carried out on the cylindrical body if the latter is sized so as to define itself a single disc-shaped body that defines at least the braking band of a brake disc.

Preferably, such moulding step h) is carried out before step g) of post-crosslinking/post-curing thermal treatment (if provided).

Figure 7:
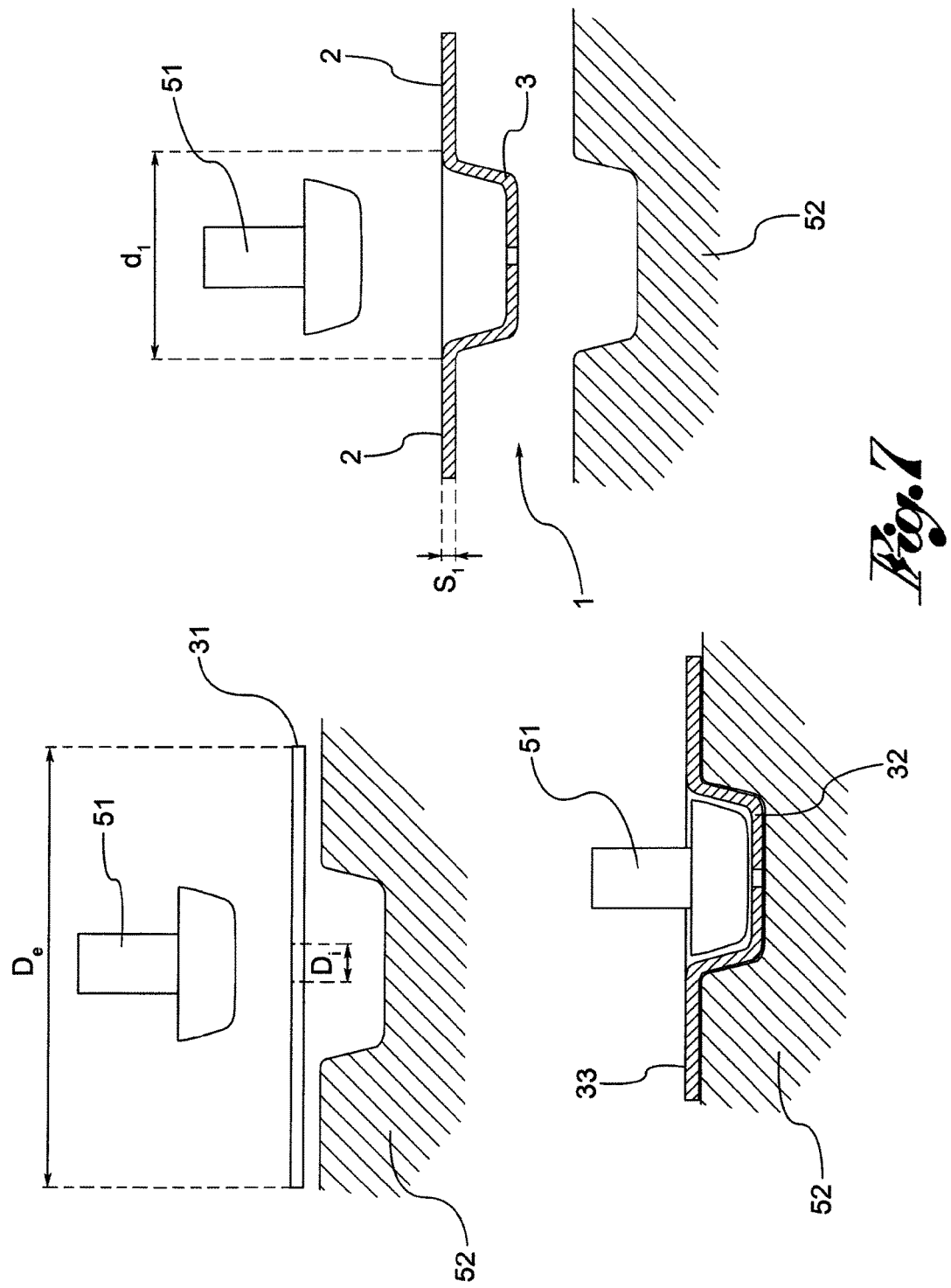
FIG. 7 shows the steps of moulding a disc obtained according to the method of the present invention to obtain the disc bell in one piece with the braking band.

According to a particularly preferred embodiment of the invention, as shown in the sequence of images of FIG. 7, the above moulding step h) is carried out on the cylindrical body or on individual slices 31 of the cylindrical body by plastically deforming a central portion of the cylindrical body 30 or of the disc-shaped body 31 defined by the single slice in the axial direction to obtain a coaxial cap 32, on the cylindrical body or on the disc-shaped body itself, axially protruding from it. Advantageously, such coaxial cap 32 (which can take any shape depending on the shape of punch 51 and of the forming counter-mould 52 used for the axial plastic deformation) may be shaped so as to define the bell of the brake disc 1. The undeformed peripheral annular portion 33 of the cylindrical body or of the disc-shaped body, on the other hand, defines the braking band 2 of the brake disc 1.

Making braking band 2 and bell 3 of a brake disc 1 in one piece allows the process of making a brake disc to be greatly simplified. In fact, the steps of setting up and assembling the bells to the braking bands are eliminated.

Preferably, in order to make the bell and the band of a disc in one piece, the winding mandrel 10 used to make the cylindrical body has an outer diameter D1 smaller than the inner diameter dl of the braking band 2 of the brake disc 1 to be obtained, such that the cylindrical body 30 or the disc-shaped body 31 defined by the single slice extends radially inwards over the annular portion 32 intended to define the braking band of the brake disc to be obtained.

Advantageously, as shown in particular in the block diagram of FIG. 2, the method may comprise a step l) of pre-heating the layer of fibres 20. Such pre-heating step l) is carried out before step b) of impregnation with resins. Preferably, in such pre-heating step l), the fibres are heated to temperatures below the cross-linking point of the resin with which the layer of fibre will then be impregnated. The pre-heating of the fibres reduces the time required for the next resin cross-linking step (step e) of heating the cylindrical body) and imparts a greater homogeneity to the material, promoting the sliding of the resin on the fibres.

Advantageously, as shown in particular in the block diagram of FIG. 2, the method may comprise a step m) of pre-heating the resin which must be applied to the layer of fibres in the impregnation step b). In such pre-heating step m), the resin is heated to temperatures below the cross-linking point in order to reduce the viscosity and increase the homogeneity thereof, thus promoting the adhesion and penetration of the resin in the layer of fibres.

Advantageously, as shown in particular in the block diagram of FIG. 2, the method may comprise a step n) of consolidation of the layer of fibres carried out after the impregnation step b). Such consolidation step n) is carried out by applying a pressure to the layer of fibres already impregnated in order to make the resin penetrate in the layer of fibres itself. Preferably, as shown in FIGS. 3, 4 and 5, such step n) is carried out via one or more pairs of opposing pressing rollers 12, between which the layer of fibres impregnated with resin is passed.

Advantageously, as shown in particular in the block diagram of FIG. 2, the method may comprise a step o) of heating the layer of fibres already impregnated with resins. Such step o) is carried out between the impregnation step b) and the winding step d). In such heating step o), the layer of impregnated fibres is progressively heated up either to temperatures close to, but lower than, resin cross-linking temperatures, or to resin cross-linking temperatures. Operatively, thanks to such heating step o), the layer of impregnated fibres is gradually heated so as to already be at operating temperature when it is wound about the mandrel and is subjected to the heating step e) for cross-linking. This allows the time of treatment to be further reduced without adopting aggressive thermal profiles.

Preferably, as shown in the system diagrams of FIGS. 3, 4 and 5, the operating steps of the method are carried out continuously on the layer of fibres 20 which is progressively formed and continuously wound about the winding mandrel 10.

More in detail, according to the system diagram shown in FIG. 3, the fibres are continuously fed by one or more coils of continuous fibres (i.e. reinforcing fibres) to the winding mandrel 10 through a series of return/tensioning rollers 13. The fibres that form the layer of fibres 20 may be fed already in the form of fabric, woven fibre cloths or non-woven fabric. In particular, the fibres (in whatever form they are) are pre-heated (step l) through one or more heating devices 41 arranged along the path of the fibres upstream of the resin impregnation area. In such pre-heating step l), the fibres may be heated to a temperature of 80° C.-120° C. As mentioned above, the heating of the fibres reduces the time required for the subsequent cross-linking step (either partial or complete) of the resin and imparts a greater homogeneity of the material by promoting the sliding of the resin on the fibres themselves. A layer of resin (either pure or in mixture with additives) is deposited in a parallel line on a transport film. The resin may be pre-heated to a temperature below the cross-linking point through one or more heating means 42 arranged along the path of the resin upstream of the area of contact with the fibres. As already mentioned, pre-heating the resin serves to reduce its viscosity and increase its homogeneity. In such pre-heating step m), the resin may be heated to a temperature in the range between 80° C. and 100° C. for epoxy resins and between 100 and 120° C. for phenolic resins. The two lines (fibre and resin) are conveyed and placed in contact preferably in a consolidation step n). In such step, the layer of fibres 20 impregnated with the resin is passed between one or more pairs of opposing pressing rollers 12 which, by applying a pressure, induce the penetration of the resin in the layer of the same fibres. Upstream and/or downstream of the pressing rollers 12 there may be provided heating means 43 which carry out the heating step o) of the layer of fibres already impregnated with resins. The layer of impregnated fibres is progressively heated so that the layer of fibres with resin reaches the resin cross-linking temperature at the time of being wound about mandrel 10. In such heating step o), the layer of fibres with resin may be progressively heated up to temperatures close to, but lower than, resin cross-linking temperatures, or optionally also to resin cross-linking temperatures. A series of pressing rollers 11 are provided at the winding mandrel 10 which allow a pressure to be applied on the cylindrical body being formed. The pressure to the cylindrical body being formed may be applied in addition to or in replacement of the pressing rollers by tensioning the layer of the fibres itself through the return rollers of the feeding system of the layer of fibres 20. If the binder resins are epoxy, the pressure is preferably between 1 and 10 bar. If the binder resins are phenolic, the pressure is preferably between 1 and 5 bar. During the winding of the layer of fibres about the mandrel, the cylindrical body being formed is heated (heating step e). Such treatment is carried out with heating means 40 arranged externally to the cylindrical body being formed. Such heating means, which may be structured so as to wind the body being formed as circumferentially as possible, may be of any type suitable for the purpose, such as resistive, by IR and/or UV lamps, ion bombing, etc. When the cylindrical body reaches the desired size, the line can be stopped and the product can be removed from the mandrel to be directly subjected to the post-curing step in furnace or be previously cut into slices to undergo any moulding treatment (step h)) and then be subjected to post-curing.

According to the system diagram shown in FIG. 4, the fibres are fed in the form of chopped fibres and deposited on a resin layer supported by a transport film 14. Such system may also be fed with continuous fibres that can be deposited according to preferential directions on the resin layer present on the transport film. A second layer of resin may be deposited on top of the layer of fibres. Advantageously, heating means 42 may be provided (to carry out step m) of pre-heating of the resin). One or more pairs of pressing rollers 12 are provided for carrying out to the consolidation step n). Upstream and/or downstream of the pressing rollers 12 there may be provided means 43 for heating the layer of fibres with resin (for carrying out the pre-heating step o)). Similarly to the diagram of FIG. 3, the layer of fibres with resin is then wound about the mandrel and then subjected to other treatments.

The system diagram of FIG. 5 differs from the diagrams of FIGS. 3 and 4 in that the fibres (in the form of continuous, woven or non-woven fibres) are impregnated by dipping in a bath of liquid resin (optionally containing additives) contained in a tank 15. Advantageously, the liquid resin may be pre-heated. At the exit of the tank, the layer of fibres 20 with resin passes through at least one pair of pressing rollers 12 in a consolidation step n). Such rollers 12 may be heated. The line then passes through a furnace 16 which promotes the cross-linking of the resin. Preferably, such furnace is kept at a temperature between 160° C. and 180° C. for epoxy resins, and between 150 and 165° C. for phenolic resins. At the exit from the furnace, the layer of fibres with resin can be subjected to further heating by heating means 43 arranged along the path and is then wound about mandrel 10 where it is treated as already described above.

In all three systems shown in FIGS. 3, 4 and 5, it may be contemplated—in combination or as an alternative to the external heating means 40 in the vicinity of the spindle—that mandrel 10 itself is heating.

The object of the present invention is a plant to implement the method of making brake discs of a fibre-reinforced material according to the present invention, in particular as described above.

The object of the present invention is a brake disc for disc brake, obtained by the method according to the present invention, in particular as described above.

As can be understood from the description, the device according to the invention allows the disadvantages of the prior art to be overcome.

In particular, thanks to the method according to the present invention it is possible to obtain a plurality of disc-shaped bodies 31 from a single semi-finished body (green body), each of which can then be processed to obtain at least the braking band 2 of a brake disc 1. The method according to the invention allows the production process of brake discs made of a fibre-reinforced material to be greatly simplified.

The advantages in terms of operational simplification are manifold. It is no longer necessary to control n distinct processes for making the green body, but only one. In fact, the semi-finished disc-shaped bodies (green bodies) that form the basis for making the brake discs need not be made one by one for each single disc, with n moulding and resin cross-linking steps.

The advantage is not only in terms of reduction of the operating steps, but also in terms of simplification of the quality control of the resulting products. In fact, the production of the disc-shaped bodies in batches, rather than in individual pieces, leads to a reduction of the operations related to quality control. Moreover, the production has more homogeneous features, both in terms of fibre distribution within the matrix and in terms of cross-linking level of the binder resin. Also clear are the advantages in terms of reproducibility of the results.

The method according to the present invention offers a high flexibility in terms of ability to control and adjust the fibre orientation and/or composition of the materials that form the cylinder (in terms of composition of resins, fibres and/or additives, if present) within the cylindrical body itself and therefore within the single disc-shaped body (defined by the cylindrical body in its entirety) or disc-shaped bodies which form at least the braking bands of the brake discs.

The method according to the present invention enables brake discs with ventilation channels to be made without having to necessarily use shaped cores. This makes the manufacturing process extremely more flexible and efficient compared to the solution which provides for the use of internal cores. Providing for the set up, positioning and extraction of cores is no longer required. Secondly, the process is not limited by the need to ensure the core removability from the cylindrical body.

By the method according to the invention it is possible to form ventilation channels with "uncommon" geometries and sizes, with undercuts and geometric anomalies. This is not possible done with traditional methods which use internal cores to be extracted later.

The method according to the present invention also allows a brake disc to be made in which braking band and bell are made in one piece. This constitutes an important element of simplification of the disc manufacturing process. In fact, the steps of setting up and assembling the bells to the braking bands are eliminated.

In order to meet specific and incidental needs, a man skilled in the art may make several changes and variations to the disc brake calipers described above, all falling within the scope of the invention as defined in the following claims.

The invention claimed is:

1. A method for making brake discs of a fibre-reinforced material, each brake disc comprising a braking band having a predetermined thickness, said method comprising the following steps:
   a) arranging a winding mandrel having a predetermined outer diameter;
   b) forming at least one layer of fibres having a predetermined width, the layer of fibres comprising chopped fibres;
   c) impregnating the layer of fibres with at least one binder resin and positioning the layer of fibres on a transport film, forming a mat of randomly arranged fibres;
   d) winding the layer of fibres impregnated with resin and positioned on the transport film about the mandrel to form a coaxially hollow cylindrical body of a brake disc, having a predetermined outer diameter and an inner diameter substantially equivalent to a diameter of the mandrel, the layer of fibres being wound about the mandrel according to at least one winding direction substantially parallel to a direction of a length of the layer; and
   e) heating the cylindrical body to at least partially cross-link the binder resin to obtain a solid semi-finished cylindrical body of a brake disc.

2. A method according to claim 1, comprising a step f) of cutting the semi-finished cylindrical body into slices transversely to a longitudinal axis of the cylindrical body according to predetermined thicknesses, each slice being a disc-shaped body which defines at least the braking band of a brake disc.

3. A method according to claim 2, comprising a step g) of post-crosslinking thermal treatment, said step g) being carried out on the semi-finished cylinder body.

4. A method according to claim 3, comprising a step h) of moulding the cylindrical body or individual slices of the cylindrical body obtained as a result of the cutting step f), the moulding step h) being carried out before the step g) of post-crosslinking thermal treatment.

5. A method according to claim 2, comprising a step g) of post-crosslinking thermal treatment, said step g) being carried out on at least a portion of the slices of the cylindrical body obtained as a result of the cutting step f).

6. A method according to claim 2, wherein the semi-finished cylindrical body or disc-shaped bodies obtained by cutting the cylindrical body are subjected to at least a pyrolysis step and a subsequent densification step to obtain carbo ceramic bodies.

7. A method according to claim 2, wherein the semi-finished cylindrical body or disc-shaped bodies obtained by cutting the cylindrical body are subjected to at least a pyrolysis step and a subsequent silicon infiltration step to obtain carbo ceramic material bodies.

8. A method according to claim 1, wherein the heating step e) of the cylindrical body is carried out at temperatures and for a period of time such as to only partially cross-link the binder resin so as to obtain a semi-finished cylindrical body which is still plastically deformable.

9. A method according to claim 1, comprising a step i) of cutting out through openings on the layer of fibres, said cut out step i) being carried out before the step d) of winding the layer about the mandrel.

10. A method according to claim 9, wherein said through openings are obtained on the layer of fibres according to a row distribution, each row of openings extending in the direction of a width of the layer, the openings of one row being aligned with the openings of the other rows in the direction of the length of the layer of fibres.

11. A method according to claim 1, wherein during the winding step d), a pressure is applied to the layer of fibres being wound to make the portion of layer of fibres being wound adhere to the cylindrical body being formed.

12. A method according to claim 11, wherein the pressure is applied to the layer of fibres by-tensioning the layer.

13. A method according to claim 11, wherein the pressure is applied to the layer of fibres through pressing rollers arranged in the vicinity of the mandrel.

14. A method according to claim 1, wherein during the heating step e) the heating of the cylindrical body being formed is carried out so as to obtain a minimum thermal gradient inside the cylindrical body being formed.

15. A method according to claim 14, wherein the step e) of heating the cylindrical body is totally or at least partly carried out during the step d) of winding the layer of fibres about the mandrel.

16. A method according to claim 15, wherein the heating of the cylindrical body being formed is obtained at least partly through a heater arranged externally to the cylindrical body being formed.

17. A method according to claim 16 wherein the heating of the cylindrical body being formed is obtained at least partly by a second heater arranged in the winding mandrel, so as to heat the cylindrical body formed also from an interior so as to obtain a minimum thermal gradient inside the cylindrical body.

18. A method according to claim 1, wherein the layer of fibres consists of carbon fibres.

19. A method according to claim 1, wherein the layer of fibres consists of continuous fibres, chopped fibres or a mixture of chopped and continuous fibres.

20. A method according to claim 1, wherein the layer of fibres comprises continuous fibres arranged according to one or more predetermined directions.

21. A method according to claim 1, wherein the layer of fibres consists of a fabric of continuous fibres.

22. A method according to claim 1, wherein the layer of fibres consists of a non-woven fabric of fibre, chopped and/or continuous.

23. A method according to claim 1, wherein said at least one layer of fibres has a multilayer structure, the layers of said multilayer structure having fibre orientations and/or compositions differing from each other.

24. A method according to claim 1, wherein during the winding step d), the winding direction of said at least one layer of fibres about the mandrel is varied to vary fibre orientation in the cylindrical body being formed.

25. A method according to claim 1, wherein said at least one layer of fibres has a fibre orientation and/or composition variable along a length and/or width development.

26. A method according to claim 1, wherein during the winding step d), multiple layers of fibres are wound about the mandrel, having different fibre orientations and/or composition.

27. A method according to claim 1, wherein the operating steps are carried out continuously on the layer of fibres which is progressively formed and continuously wound about the winding mandrel.

28. A method for making brake discs of a fibre-reinforced material, each brake disc comprising a braking band having a predetermined thickness, said method comprising the following steps:
  a) arranging a winding mandrel having a predetermined outer diameter;
  b) forming at least one layer of fibres having a predetermined width;
  c) impregnating the layer of fibres with at least one binder resin;
  d) winding the layer of fibres impregnated with resin about the mandrel to form a coaxially hollow cylindrical body of a brake disc, having a predetermined outer diameter and an inner diameter substantially equivalent to a diameter of the mandrel, the layer of fibres being wound about the mandrel according to at least one winding direction substantially parallel to a direction of a length of the layer; and
  e) heating the cylindrical body to at least partially cross-link the binder resin to obtain a solid semi-finished cylindrical body of a brake disc;
  f) cutting the semi-finished cylindrical body into slices transversely to a longitudinal axis of the cylindrical body according to predetermined thicknesses, each slice being a disc-shaped body which defines at least the braking band of a brake disc;
  g) post-crosslinking thermal treatment, said step g) being carried out on the semi-finished cylinder body;
  h) moulding the cylindrical body or individual slices of the cylindrical body obtained as a result of the cutting step f), the moulding step h) being carried out before the step a) of post-crosslinking thermal treatment;
  wherein the moulding step h) is carried out on the cylindrical body or on individual slices of the cylindrical body by plastically deforming in the axial direction a central portion of the cylindrical body or of the disc-shaped body defined by a single slice to obtain a coaxial cap on the cylindrical body or on the disc-shaped body, axially protruding therefrom, said coaxial cap defining a bell of the brake disc, an unreformed peripheral annular part of the cylindrical body or of the disc-shaped body defining the braking band of the brake disc.

29. A method according to claim 28, wherein the mandrel has an outer diameter smaller than the inner diameter of the braking band of the brake disc to be obtained, so that the cylindrical body or the disc-shaped body defined by the single slice extends radially inwards over an annular portion adapted to define the braking band of the brake disc to be obtained.

30. A method for making brake discs of a fibre-reinforced material, each brake disc comprising a braking band having a predetermined thickness, said method comprising the following steps:
  a) arranging a winding mandrel having a predetermined outer diameter;
  b) forming at least one layer of fibres having a predetermined width;
  c) impregnating the layer of fibres with at least one binder resin;
  d) winding the layer of fibres impregnated with resin about the mandrel to form a coaxially hollow cylindrical body of a brake disc, having a predetermined outer diameter and an inner diameter substantially equivalent to a diameter of the mandrel, the layer of fibres being wound about the mandrel according to at least one winding direction substantially parallel to a direction of a length of the layer;
  e) heating the cylindrical body to at least partially cross-link the binder resin to obtain a solid semi-finished cylindrical body of a brake disc; and
  f) cutting out through openings on the layer of fibres, said cut out step f) being carried out before the step d) of winding the layer about the mandrel;
  wherein said through openings are obtained on the layer of fibres according to a row distribution, each row of openings extending in the direction of a width of the layer, the openings of one row being aligned with the openings of the other rows in the direction of the length of the layer of fibres;
  wherein interdistance between the rows of openings is adjusted as a function of the radial position that the single row must take in the cylindrical body relative to the other rows, so that during the winding step d) the openings radially overlap so as to form radial cavities, each of the radial cavities extends from the outer surface of a final cylindrical body up to a predetermined radial depth, said cavities defining radial ventilation channels formed in the thickness of the braking band of the brake disc to be obtained.

31. A method according to claim 30, wherein size and shape of the openings of the individual rows are adjusted as a function of a radial position that the single row must take in the cylindrical body relative to the other rows, so as to adjust the inner section of each radial cavity according to the radial dimension.

\* \* \* \* \*